June 4, 1968   A. L. MORSELL III   3,386,425
INTERNAL COMBUSTION ENGINES
Filed July 11, 1966   3 Sheets-Sheet 1
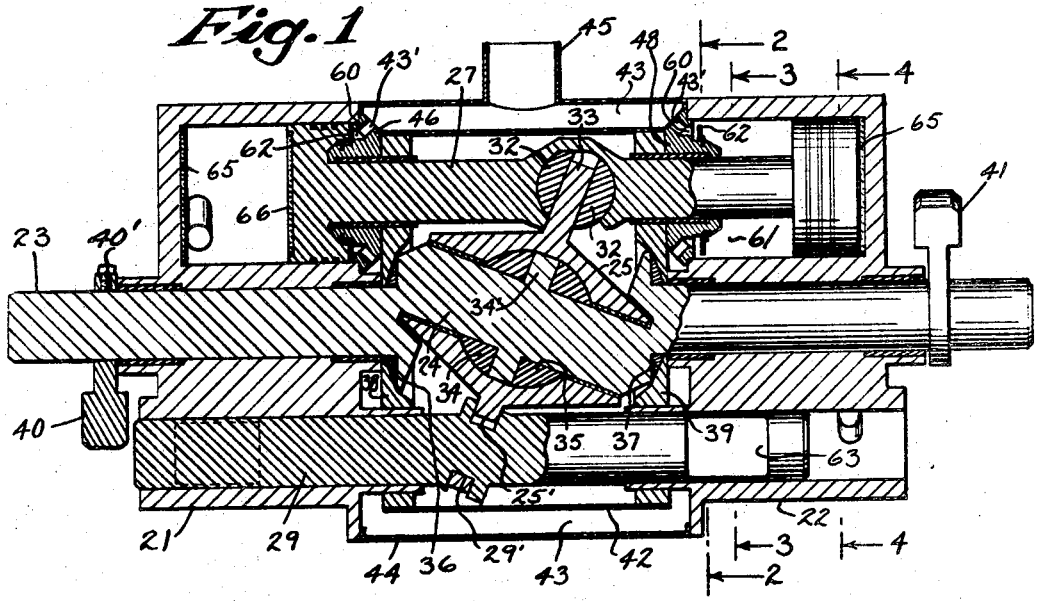
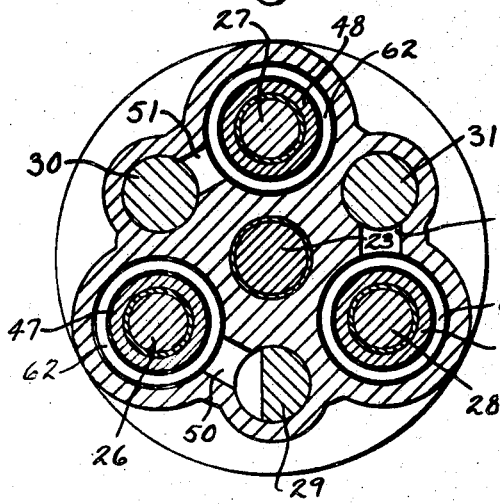
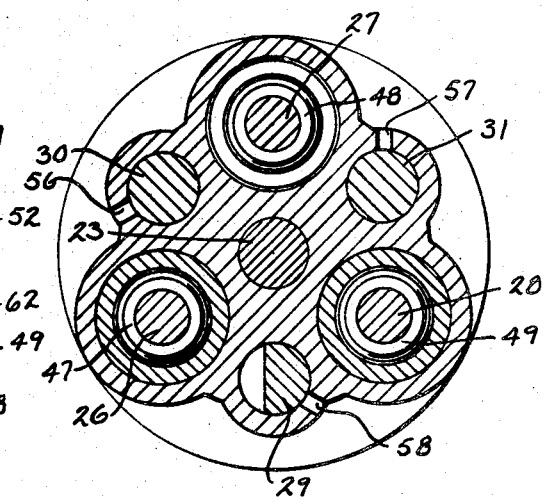
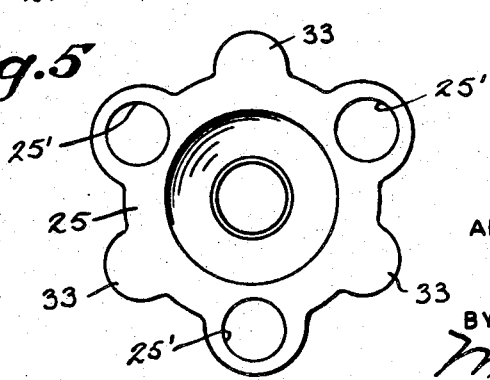
INVENTOR
ARTHUR L. MORSELL, III
BY
*Morsell & Morsell*
ATTORNEYS June 4, 1968      A. L. MORSELL III      3,386,425
INTERNAL COMBUSTION ENGINES
Filed July 11, 1966      3 Sheets-Sheet 2
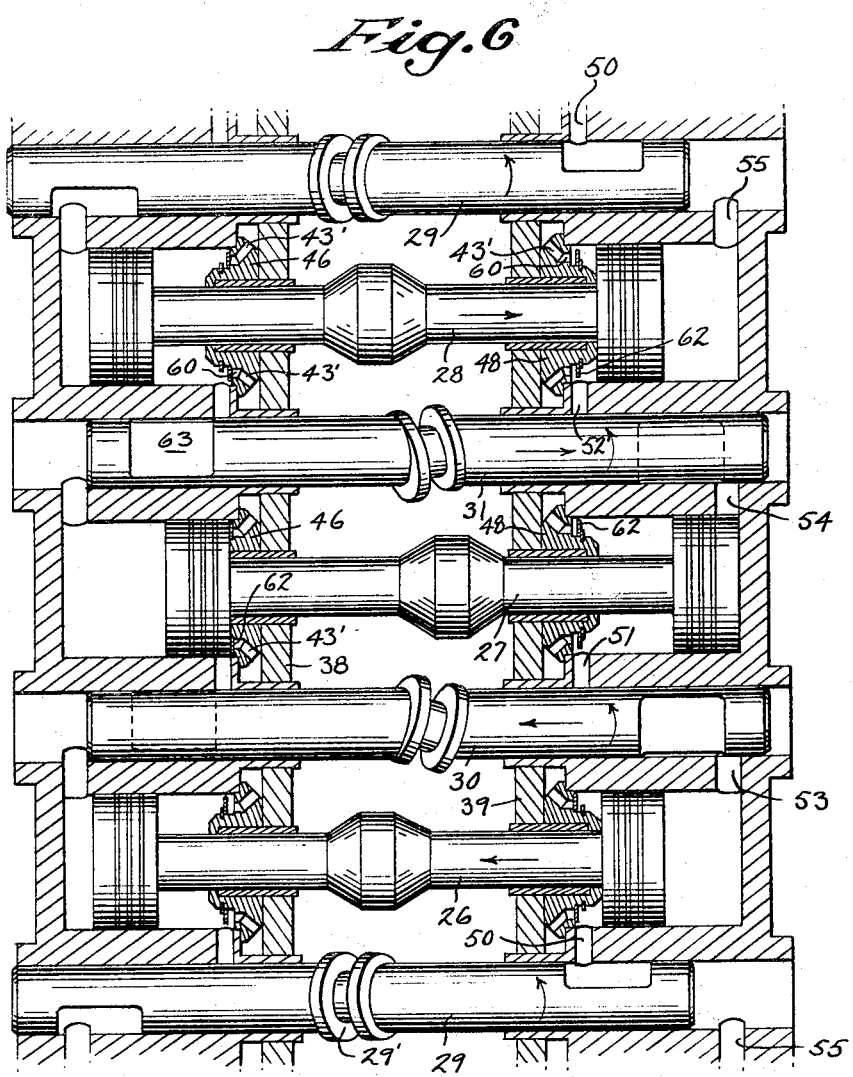
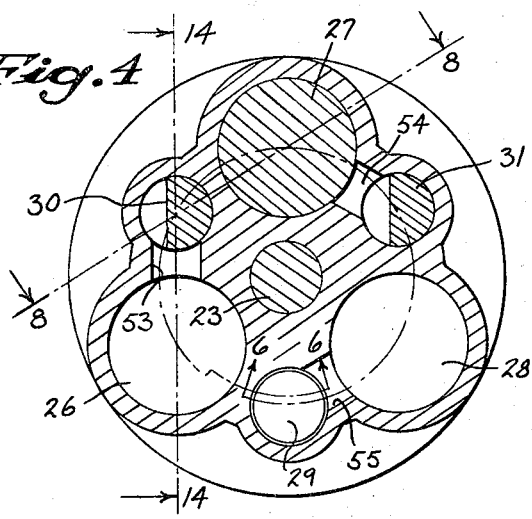
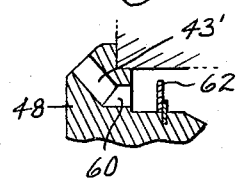
INVENTOR
ARTHUR L. MORSELL, III
BY
ATTORNEYS June 4, 1968 A. L. MORSELL III 3,386,425

INTERNAL COMBUSTION ENGINES

Filed July 11, 1966 3 Sheets-Sheet 3

INVENTOR
ARTHUR L. MORSELL, III

BY
*Morsell & Morsell*
ATTORNEYS

United States Patent Office 3,386,425
Patented June 4, 1968

3,386,425
INTERNAL COMBUSTION ENGINES
Arthur L. Morsell III, 2020 N. Beverly Glen Blvd.,
Los Angeles, Calif. 90024
Filed July 11, 1966, Ser. No. 564,217
14 Claims. (Cl. 123—58)

ABSTRACT OF THE DISCLOSURE

An internal combustion engine having a rotatable output shaft and having a plurality of sets of opposed cylinders and pistons in circular formation around the output shaft, a movable valve rod for each set having means for transferring a compressed charge from a cylinder of one set to a cylinder of another set for expansion in the latter, and a wobble plate drive for the output shaft.

---

This invention relates to improvements in internal combustion engines and is particularly related, but not necessarily limited, to the barrel type of reciprocating engines having a central power shaft surrounded by a number of cylinders parallel to the shaft. This invention is also particularly related to those engines, not necessarily of the barrel type, incorporating separate chambers for gas compression and gas expansion. The basic design of this engine is readily adaptable to operation as a carburetted engine burning volatile fuels or as a diesel engine employing fuel injection.

One of the objects of this invention is to provide a general purpose internal combustion engine of smaller size, lighter weight, and lower cost than present popular engine types. The small size and light weight of the engine result from the use of both sides of the pistons and from the compact arrangement of the centrally located wobble plate. The low cost is derived from the small size of the engine, the simplicity of the design, and the fact that symmetries in the design permit many of the parts to be identical.

A further object of the invention is to provide a novel arrangement wherein compressed charges of combustible mixture from the compression chamber of the cylinder for one piston are transferred by an intervening transfer member to the expansion chamber of the cylinder for another piston for expansion therein.

A serious shortcoming of most engines of the barrel type derives from the fact that prior wobble plate engines generally incorporate opposed pistons linked to two wobble plate assemblies, one at each end of the engine. The axial thrust loads on each of these wobble plate assemblies are essentially unidirectional, with the result that simple oil-film thrust bearings cannot be used; one must resort either to rolling contact bearings or to bearings of the Kingsbury type. Wobble mechanisms properly designed to sustain unidirectional thrust loads are massive, bulky and expensive. It is an object of this invention to eliminate this shortcoming by using a single, centrally located wobble mechanism on which the oscillating thrust loads are bidirectional and algebraically average to zero. Under these conditions simple oil-film thrust bearings are entirely adequate; and the mechanism is reduced in size, weight and cost.

Another object of this invention is to provide an engine with very smooth output torque in comparison with conventional engines of similar complexity. The six overlapping power pulses per revolution of the crankshaft produce a torque as smooth as that obtainable from a conventional 12-cylinder 4-stroke cycle engine.

It is a further object of this invention to provide an engine in which all oscillating forces are automatically balanced and for which the remaining oscillating moments may be completely cancelled by proper adjustment of small counterweights at each end of the crankshaft.

Heat must be continually removed by the cooling system of an internal combustion engine in order to prevent high temperature breakdown of lubricating oil films, softening of metals at high temperatures, etc. In conventional carburetted engines the surfaces of the piston head and cylinder head must be maintained at moderately low temperatures in order to prevent pre-ignition of the air-fuel mixture. However, when the compression and expansion processes are separated, as in the present invention, the compression chamber is easily kept cool; and the expansion chamber, where most of the heat transfer from the combustion products would normally take place, may be permitted to have very hot surfaces. It is an object of this invention to take advantage of this situation by thermally insulating the piston head and cylinder head of the expansion chamber, with the consequence that these surfaces go to very high temperatures and heat transfer from the hot gases is reduced. The reduced heat transfer results in reduced demand on the cooling system and increased power output and thermal efficiency. In addition, the hot surfaces may be used for igniting the fuel and thus permit the elimination of the usual timed spark ignition system, a major source of failures in conventional engines.

Further objects will appear in the subsequent description.

Briefly, the preferred embodiment of the design consists of a single, centrally located wobble plate journaled on the oblique crank of a wobble crankshaft running through the center of the engine. Arranged around the shaft and preferably parallel to the axis of rotation of the shaft are three piston assemblies separated by three valve rods. The piston assemblies consist of rigid rods engaging the wobble plate in the center of the rods with pistons rigidly affixed to each end. The valve rods are likewise double-ended rigid members engaging the wobble plate at the centers of the rods. The mechanical constraints are such that the piston assemblies oscillate sinusoidally while the valve rods not only oscillate but also rotate about their own axes. The regions on one side of each of the six pistons form the compression chambers; the regions on the other side of the pistons form the power delivery or expansion chambers. A novel feature resides in the fact that compressed gas is transferred from the compression chamber associated with one piston to the expansion chamber associated with a neighboring piston by means of a moving chamber formed by a cut-out in the valve rod located between the two pistons. The intake valve is of the simple, automatic, pressure-operated type commonly found in air compressors. The other valving operations are handled by the valve rods.

The accompanying drawings represent in a schematic manner a preferred form of the invention. In the interest of clarity there has been no attempt to show the details required by the lubrication and cooling systems.

FIG. 1 is a central, vertical, longitudinal sectional view of the engine.

FIGS. 2, 3 and 4 are transverse sectional views taken along the respectively numbered lines of FIG. 1.

FIG. 5 is an end view of the wobble plate.

FIG. 6 is a schematic diagram showing the piston assemblies and valve rods as if they were unwrapped from around the crankshaft. The housing, also unwrapped and straightened out, is shown in section, and the view is from the outside inward. The valve rod 29 is shown twice. The section is taken along the curved line 6—6 of FIG. 4.

Figure 7:
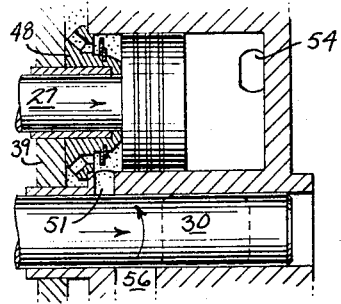
Figure 8:
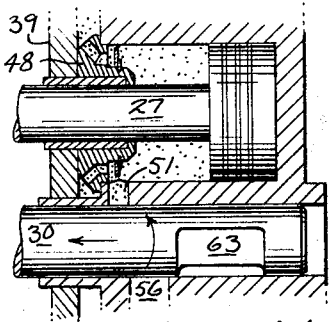
Figure 12:
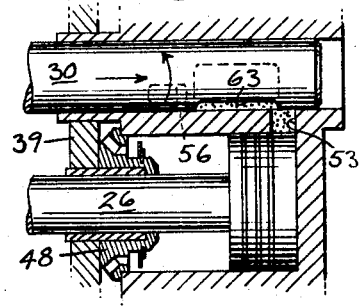
Figure 13:
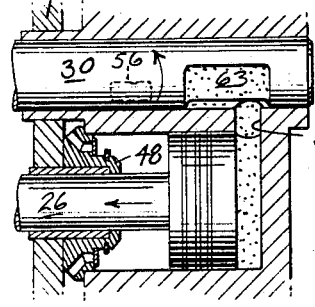
Figure 14:
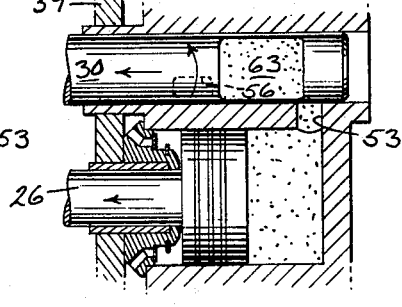

FIGS. 7 through 17 are sectional views chosen to show the progress of a single batch of gas from intake to exhaust. For FIGS. 7 through 11 the section is taken along line 8—8 of FIG. 4; for FIGS. 12 through 17 the section is taken along line 14—14 of FIG. 4. FIGS. 8 and 14 represent the same wobble crank rotational position as FIGS. 1 through 4.

FIG. 18 is a fragmentary sectional detail view showing the intake valve.

Referring more particularly to the drawing, in FIG. 1 the two halves of the engine block are designated by the numerals 21 and 22. Through the centers of the two halves of the block is journaled shaft 23, which includes a single oblique wobble crank 24. Journaled on wobble crank 24 is wobble plate 25 having holes 25', an end view of which is shown in FIG. 5. The wobble plate engages three piston assemblies 26, 27, 28 and three valve rods 29, 30, 31 which have portions extending through the holes 25', all of which rods are arranged around the shaft 23 as shown in FIGS. 2, 3 and 4. Only piston assembly 27 and valve rod 29 can be seen in FIG. 1.

Forces are transmitted between the piston assemblies and the wobble plate through segments of spheres swiveling in spherical sockets in the centers of the piston rods and bearing against the faces of the projections 33 of the wobble plate. Sphere segments 32 in the ball sockets of piston assembly 27 are visible in FIG. 1. Each valve rod has a centrally located oblique circular groove 29' providing a neck portion which passes rotatably and loosely through one of the holes 25' and the sides of which groove bear directly against the faces of the wobble plate, as shown in FIG. 1 for valve rod 29. The angle between the axis of the oblique groove and the longitudinal axis of the valve rod must be equal to the angle between the axis of wobble crank 24 and the axis of shaft 23. Then, because the faces of the wobble plate are perpendicular to the wobble plate axis, geometric laws require that the axis of the groove in the valve rod remain always parallel with the wobble crank axis and consequently that rotation of shaft 23 about its axis be accompanied by equal rotations of the valve rods about their own axes. Because the narrow centers of the valve rods pass through holes in the wobble plate and because the scalloped edges of the wobble plate extend into the piston assembly ball sockets, the wobble plate is prevented from rotating and merely wobbles while the crank rotates. The geometrical relationships are such that uniform rotation of the crank is associated with simple harmonic motion of the pistons and valve rods, as well as with uniform rotation of the valve rods.

The axial forces between the wobble plate 25 and the crank 24 are absorbed by self-aligning bearing rings 34 and 35, each of which has a spherical surface swiveling slightly in a socket in the wobble plate and a flat surface bearing against a flange 34' in the center of the crank. Similar self-aligning bearing rings 36 and 37 absorb the thrust between shaft 23 and the crankcase bulkheads 38 and 39.

Because the three piston assemblies and the three valve rods execute simple harmonic motion and because they are arranged symmetrically about the crankshaft, it can be shown that the algebraic sum of the longitudinal inertial forces is always zero. However, because the inertial forces are not colinear, there is a resultant couple which tends to turn the engine in an axial plane which rotates as the shaft rotates. This rotating couple may be perfectly balanced by an equal and opposite centrifugal couple produced by small counterweights 40 and 41 mounted on each end of shaft 23, as shown in FIG. 1, and each equipped with a set screw 40' or the equivalent. The degree of compensation provided by the counterweights is easily adjusted by sliding the counterweights on the shaft to change the length of the moment arm between them.

The bulkheads 38 and 39 together with the inner cylindrical shell 42 separate the crankcase from the annular intake chamber 43, bounded outside by outer cylindrical shell 44 and communicating with the spaces between each of the bulkheads 38 and 39 and the engine block halves 21 and 22. Either air, for diesel operation, or air-fuel mixture, for carburetor operation, enters the chamber 43 through intake passage 45 and thence finds it way into the many small slanted holes 43' around the periphery of each of the intake valve assemblies. Intake valve assemblies 46 and 48 are shown in section in FIG. 1, and intake valve assemblies 47, 48 and 49 can be seen end on in FIG. 2. For each intake valve assembly the small slanted holes 43' communicate with a circular groove 60 facing into the compression chamber 61, which is the region between the piston and the intake valve assembly. A light circular ring 62, mounted for movement longitudinally, is forced against the groove as on the left side of FIG. 1, completely covering it to prevent gas flow, when the pressure in the compression chamber is higher than that in the groove. When the pressure in the groove is higher, the ring 62 lifts off the groove, as at the right in FIG. 1, permitting gas to flow into the compression chamber.

At the compression end, i.e. the end near the intake valve assemblies, of the engine block halves there are passages connecting the compression chambers with the cylindrical cavities housing the valve rods. Compression passages 50, 51 and 52 in the right-hand half of the engine are visible in FIG. 2. At the expansion end, i.e. the outer end, of the engine block halves there are passages connecting the valve rod cavities with the expansion chambers, i.e. the chambers formed between the outer faces of the pistons and the outer ends of the cylindrical cavities housing the pistons. Expansion passages 53, 54, 55 in the right-hand half of the engine are shown in FIG. 4.

The valve rod cavities communicate with the outside, or preferably with an appropriate exhaust manifold not shown in the figures, via the open ends of the cavities. In addition there are auxiliary exhaust passages located as shown in FIG. 3, where the auxiliary exhaust passages for the right-hand half of the engine are designated by the numerals 56, 57 and 58.

FIG. 6 aids in understanding the arrangement of the various cavities and passages and shows the instantaneous positions of the piston assemblies 26, 27 and 28 and the valve rods 29, 30 and 31 for the particular wobble crank angular position of FIG. 1. Because FIG. 6 represents each part as if viewed from a vantage point outside the engine on an extension of a radial line from the crankshaft axis through the part, the piston assemblies, the valve rods, and the housing appear in the figure as though unwrapped from around the crankshaft. Note that the wobble plate is omitted and that valve rod 29 is shown twice.

OPERATION

In the operation of the engine, as the three piston assemblies 26, 27, 28 reciprocate in their cylinders, thrust applied successively to the various pistons by the hot combustion products is transmitted to the wobble plate 25 causing it to wobble and thus impart rotation to the wobble crank 24 and to shaft 23, from which useful power may be taken. In addition, the wobble plate also imparts both rotating and reciprocating motions to the valve rods. The manner in which the valve rods control the flow of gas through the engine is explained with the aid of FIGS. 7 through 17. These figures follow the progress of a batch of gas through the engine from intake to exhaust. Though the figures appear similar to parts of FIG. 6, the views are in fact different, since they are all plane sectional views rather than the unwrapped circular section of FIG. 6. FIGS. 7 through 11 show the right-hand ends of piston assembly 27 and valve rod 30, while FIGS. 12 through 17 show the same valve rod now with the right-hand end of piston assembly 26. Auxiliary exhaust passage 56 is cut by the section plane (line 8—8 of FIG. 4) of FIGS. 7 through 11 and is visible at the bottom of FIGS. 7-11, while in FIGS. 12 through 17 the auxiliary exhaust passage 56 is located above the section plane (line 14—14 of FIG. 4) and is shown by dotted lines in FIGS. 12–17. The arrows on the piston assemblies and the valve rods show their instantaneous directions of motion. In explaining these figures it will be assumed first that the engine is operating as a carburetted engine.

In FIG. 7 intake has begun. Air-fuel mixture is entering the compression chamber through the slanted holes 43' in the intake valve assembly 48. Compression passage 51 is blocked by valve rod 30.

In FIG. 8 (120° of shaft rotation after FIG. 7) intake is nearly complete. The compression passage 51 is still blocked by the valve rod.

Figure 9:
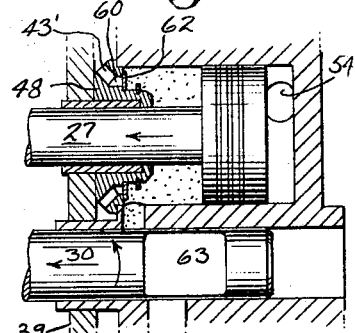

In FIG. 9 (60° of shaft rotation after FIG. 8) compression has begun. The intake valve ring 62 is now forced against the groove 60 in the intake valve assembly by the higher pressure in the compression chamber. The cut-away region of the valve rod forms a chamber 63, called the transfer chamber, which is just beginning to communicate with the compression port 51.

Figure 10:
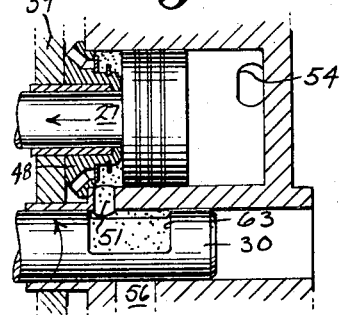

In FIG. 10 (60° of shaft rotation after FIG. 9) the compression process is continuing. The air-fuel mixture is being forced through the compression passage 51 into the transfer chamber 63 of the valve rod.

Figure 11:
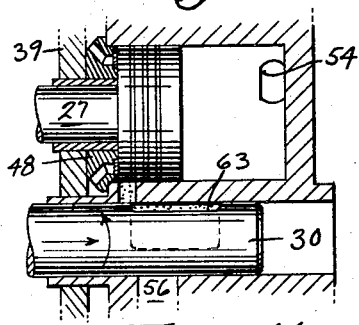

In FIG. 11 (60° of shaft rotation after FIG. 10) the compression process is complete. Most of the air-fuel mixture which was drawn into the compression chamber has been forced at elevated pressure into the transfer chamber 63. Communication between the compression passage and the transfer chamber is just about to cease.

In FIG. 12 (60° of shaft rotation after FIG. 11) the combination of the longitudinal and rotational motions of the valve rod have carried the transfer chamber 63, with its load of compressed air-fuel mixture, into communication with expansion passage 53 associated with piston assembly 26. Some of the air-fuel mixture has entered the expansion chamber and has been ignited by the hot surfaces there. A flame front has started moving back into the transfer chamber, and the pressure is rising rapidly as combustion proceeds.

In FIG. 13 (60° of shaft rotation after FIG. 12) combustion is complete; the temperature and pressure of the combustion products are quite high, and expansion is in progress.

In FIG. 14 (60° of shaft rotation after FIG. 13) expansion is nearly complete. The transfer chamber 63 is just about to stop communicating with the expansion passage and is just about to begin communicating with the auxiliary exhaust 56. It must be kept in mind that the auxiliary exhaust 56 is above the section plane toward the viewer in FIGS. 12 through 17.

Figure 15:
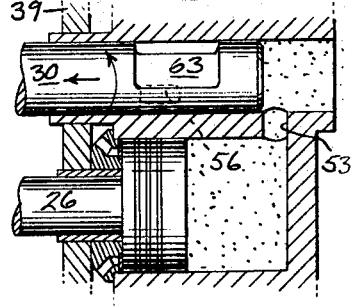

In FIG. 15 (60° of shaft rotation after FIG. 14) the transfer chamber is no longer communicating with the expansion passage but has been communicating with the auxiliary exhaust 56 for about 50° of shaft rotation. The hot, high pressure gases remaining in the transfer chamber have been exhausted through the auxiliary exhaust passage, leaving the transfer chamber at near atmospheric pressure and ready to receive a new charge of air-fuel mixture. In the expansion chamber the expansion process is complete; the expansion chamber communicates with the main exhaust passage at the end of the valve cylinder; and the expanded combustion products have begun to leave the expansion chamber.

Figure 16:
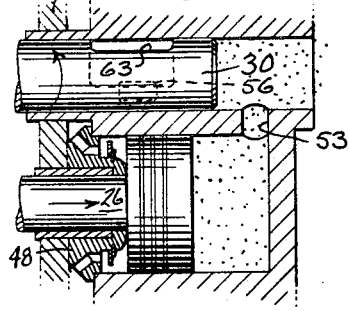

In FIG. 16 (60° of shaft rotation after FIG. 15) the remaining combustion products are being forced out of the expansion chamber via the expansion passage and the main exhaust passage at the end of the valve cylinder.

Figure 17:
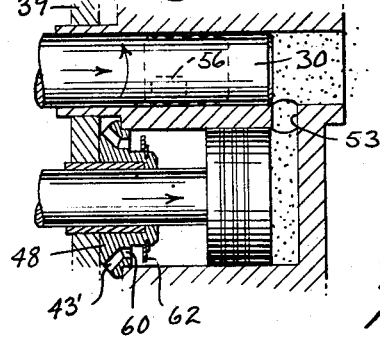

In FIG. 17 (60° of shaft rotation after FIG. 16) the exhaust process is nearly complete. While the exhaust process was taking place, the transfer chamber was picking up a new charge of air-fuel mixture, as shown in FIGS. 9, 10 and 11. In about 40° of shaft rotation the expansion passage will be closed by the valve rod, and about 10° later the fresh air-fuel mixture will begin to enter the expansion chamber.

As shown in FIG. 1 of the drawing, insulation may be provided for the cylinder heads as at 65 and for the piston heads as at 66. This may be thin layers of refractory or other suitable material. Where such insulation is provided, these surfaces go to very high temperatures which may be used in igniting the combustible mixture in the expansion chamber. With the reduction of heat transfer from the hot gases there is reduced demand on the cooling system and thus there is increased power output and thermal efficiency. For clarity, the insulation 55 and 56 has only been shown in FIG. 1. Where insulation is not employed, any known ignition system may be used such as the conventional timed spark ignition, or a glowing wire which is stretched across the expansion passage and which can be heated electrically at the time of starting the engine, with power disconnected after starting, the wire remaining quite hot because of heat transfer from the hot products of combustion.

While it is preferred to have opposed pistons on each piston rod, it is practical to make use of only a single piston on each piston rod. Also, while it is preferred that the output shaft be centrally located and parallel to the piston rods, this is not essential. An important novel feature of the invention is the arrangement of double-acting pistons (both sides of each piston being used) together with the use of transfer members having transfer chambers for transferring compressed charges of combustible mixture from the compression chamber of the cylinder for one piston to the expansion chamber of the cylinder for a neighboring piston for expansion in the expansion chamber of the latter cylinder.

For operation as a diesel engine the sequence of events is altered only slightly. Pure air instead of an air-fuel mixture is inducted and compressed into the transfer chamber. The compression ratio should be high enough to give a temperature after compression sufficient to ignite the fuel. Fuel is injected into the transfer chamber just after compression is complete (FIG. 11) and combustion takes place while the burning mixture is isolated from both the compression side of piston assembly 27 and the expansion side of piston assembly 26. Combustion is complete by the time the transfer chamber begins to communicate with the expansion passage (FIG. 12). The expansion and exhaust processes are the same as for carburetted operation.

Various other changes and modifications may be made without departing from the spirit of the invention, and all of such changes are contemplated as may come within the scope of the claims.

What I claim is:

1. In an internal combustion engine having a rotatable output shaft and having a plurality of sets of opposed cylinders arranged in circular formation and in parallelism with each other, a pair of opposed pistons for each set of cylinders, a reciprocally mounted piston rod extending between the pistons of each pair, movably mounted valve rods, one for each set of opposed cylinders, means including chambers in said valve rods for transferring compressed charges of combustible mixture from a cylinder of one set to a cylinder of another set for expansion in the latter cylinder, there being means for controlling exhaust, and means for transmitting power from the piston rods to said output shaft and to said valve rods to rotate the output shaft and simultaneously to move said valve rods.

2. An internal combustion engine as claimed in claim 1 in which there are three sets of opposed cylinders and pistons, and in which there are three valve rods.

3. An internal combustion engine as claimed in claim 1 in which the output shaft is central and is substantially parallel with the piston rods and valve rods, and in which the means for transmitting power from the piston rods to the central output shaft and to the valve rods includes a single, centrally-located wobble plate on the output shaft with driving connections between intermediate portions of the length of said piston rods and wobble plate and between said wobble plate and valve rods.

4. An internal combustion engine as claimed in claim 1 in which the valve rods are disposed in altering relationship with the sets of opposed cylinders.

5. An internal combustion engine as claimed in claim 1 in which the output shaft is central and is substantially parallel with the piston rods, and in which the means for transmitting power from the piston rods to the central output shaft and to the valve rods includes a single, centrally-located wobble plate on the output shaft with driving connections between intermediate portions of the length of said piston rods and wobble plate.

6. An internal combustion engine as claimed in claim 1 in which the output shaft is centrally located and in which the piston rods and valve rods are arranged around the output shaft and in substantial parallelism therewith.

7. An internal combustion engine as claimed in claim 1 in which the output shaft is centrally located and in which the piston rods are arranged around the output shaft and in substantial parallelism therewith.

8. An internal combustion engine as claimed in claim 1 in which the valve rods are both slidable and rotatable, and in which the power transmitting means causes both slidable and rotatable motion thereof.

9. An internal combustion engine as claimed in claim 1 in which the valve rods are rotatable and in which the power transmitting means causes rotation thereof.

10. An internal combustion engine as claimed in claim 8 in which there are valve rod bores for slidably and rotatably receiving the valve rods, and in which the transfer chambers of the valve rods have portions which communicate with the outsides of the rods and which are movable in said bores.

11. An internal combustion engine as claimed in claim 9 in which there are valve rod bores for rotatably receiving the valve rods, and in which the transfer chambers of the valve rods have portions which communicate with the outsides of the rods and which are rotatable in said bores.

12. An internal combustion engine as claimed in claim 1 in which there is means including auxiliary exhaust ports controlled by the valve rods for exhausting the transfer chambers of the valve rods.

13. An internal combustion engine as claimed in claim 1 in which the means for transmitting power includes a wobble plate on said output shaft with driving connections between said piston rods and said wobble plate.

14. An internal combustion engine as claimed in claim 1 in which the means for controlling exhaust includes exhaust ports controlled by the valve rods.

References Cited

UNITED STATES PATENTS

| | | | |
|---|---|---|---|
| 1,138,783 | 5/1915 | Perugini | 123—58 |
| 1,536,780 | 5/1925 | Ensign | 123—68 |
| 1,610,060 | 12/1926 | Lind | 123—58 |
| 1,788,259 | 1/1931 | Ward et al. | 123—58 |
| 2,966,899 | 1/1961 | Herrmann | 123—58 |

WENDELL E. BURNS, *Primary Examiner.*